United States Patent [19]

Hyltoft

[11] Patent Number: 4,569,582
[45] Date of Patent: Feb. 11, 1986

[54] PROCESSING STATIONS FOR AN ELECTROPHOTOGRAPHIC INFORMATION PRINTER

[75] Inventor: Hans C. Hyltoft, Vaerlose, Denmark

[73] Assignee: Mercante International A/S, Glostrup, Denmark

[21] Appl. No.: 684,924

[22] PCT Filed: Mar. 28, 1984

[86] PCT No.: PCT/DK84/00022
§ 371 Date: Nov. 2, 1984
§ 102(e) Date: Nov. 2, 1984

[87] PCT Pub. No.: WO 84/03972
PCT Pub. Date: Oct. 11, 1984

[30] Foreign Application Priority Data

Nov. 3, 1983 [DK] Denmark .............................. 5047/83

[51] Int. Cl.$^4$ ............................................. G03G 15/00
[52] U.S. Cl. ................................ 355/3 R; 355/3 DR; 355/3 SH; 355/20
[58] Field of Search ................. 355/3 R, 3 DR, 14 R, 355/20, 8, 11, 3 SH, 16; 271/162

[56] References Cited

U.S. PATENT DOCUMENTS

| | | | |
|---|---|---|---|
| 3,698,804 | 10/1972 | Cranskens et al. | 355/3 |
| 3,883,242 | 5/1975 | Takahashi et al. | 355/3 R |
| 4,027,961 | 6/1977 | Starkweather | 355/11 X |
| 4,080,058 | 3/1978 | Stephany et al. | 355/20 X |
| 4,165,069 | 8/1979 | Colglazier et al. | 271/162 |
| 4,180,319 | 12/1979 | Kaufmann et al. | 355/3 R |
| 4,236,807 | 12/1980 | Kuehnle | 355/3 R |
| 4,270,859 | 6/1981 | Galbraith et al. | 355/16 X |
| 4,386,838 | 6/1983 | Hirabayashi et al. | 355/3 DR |
| 4,470,689 | 9/1984 | Nomura et al. | 355/3 R |
| 4,500,195 | 2/1985 | Hosono | 355/3 R |

*Primary Examiner*—A. C. Prescott
*Attorney, Agent, or Firm*—Bernard, Rothwell & Brown

[57] ABSTRACT

An electrophotographic information printer, particularly for use in connection with electronic data and word processing systems comprises as processing stations a photoconductor station (9), an imaging station (3) in optical information transfer communication with the photoconductor station (9), a developer station (10) having a toner development system and a toner cleaning station (13) arranged in operative relation to the photoconductor station (9), an image transfer station (16) for transferring a toner image on the photoconductor to a sheet-shaped printing material, a first advancing station (17) arranged between the image transfer station (16) and a supply of printing material, a fixation station (23) and a second advancing station (21) arranged between the image transfer station (16) and the fixation station (23). All processing stations (9, 10, 13, 17, 21, 23) having mechanical movement functions are designed as separate, individually replaceable modules for insertion into a machine casing (1, 2) and have each its own independent driving means in the form of an electronic stepping motor. As external connections the modules have only connection plugs (27–29) for direct insertion into terminal connections (30–32) in a coupling unit (33) for connection with an operational voltage source (34) and common program-controlled control unit (35).

8 Claims, 5 Drawing Figures

PROCESSING STATIONS FOR AN ELECTROPHOTOGRAPHIC INFORMATION PRINTER

The invention relates to an electrophotographic information printer, particularly for use in connection with electronic data and word processing systems, said printer having a number of processing stations comprising

- a photoconductor station with an electrostatically chargeable, movable photoconductor;
- an imaging station in optical information transfer relation to the photoconductor station;
- a developer station with a toner development system and a toner cleaning station arranged in operative relation to the photoconductor station;
- an image transfer station arranged in operative relation to the photoconductor station for transferring a toner image on the photoconductor to a sheet-shaped printing material;
- a first advancing station arranged between the image transfer station and a supply of printing material;
- a fixation station for permanently affixing a toner image to the printing material; and
- a second advancing station arranged between the image transfer station and the fixation station.

Information printers for use in connection with data and word processing systems may essentially be divided into two main categories. In one category the transformation of electronic character information into printed information on a paper sheet is performed by means of writing devices operating with mechanical impact in connection with carbon ribbons in the same way as known from manually operated typewriters. Printers of this category comprising inter alia matrix printers and daisy-wheel printers have a relatively low speed and have appeared in practice to be rather sensitive in mechanical respects and, in addition, in respect of reproduction performance they are limited to a definite number of characters.

The other main category operates without mechanical impact and comprises mainly so-called jet-ink printers and machines operating with an electrophotographic transfer of information in connection with the xerographic reproduction technology known from usual copying machines. In particular machines of the latter kind comprise laser printers in which an electrostatically latent image is formed on a photoconductor by means of a controlled laser beam. Due to the very high printing speed and the fact that in respect of information reproduction they are not limited to a definite number of e.g. alpha-numerical characters defined e.g. by the characters on a daisy-wheel, these machines are finding increasing use.

The electrostatically latent image is developped by means of toner powder and is transferred to a paper sheet and affixed thereto under use of the well-known xerographic technology.

Since the starting point for such information printers has been the technology known from usual xerographic copying machines, these machines are designed in practice in the same way as conventional copying machines with a single motor as a driving member for several mechanically movable, usually rotatable members such as a photoconductor drum, sheet advancing rollers, and toner transport mechanisms, complicated transmission means being often used between the driving means and the individual rotating members or between the latter mutually.

As in the case of conventional copying machines this machine design makes maintenance heavily complicated and often results in interruptions of operation of long duration, since irregularities in the mechanical functions usually requires a difficult and time-consuming repair involving replacement and/or adjustment of components which are frequently difficult to access.

Whereas these disadvantages may usually be tolerated in connection with conventional reproduction equipment they will often be considered unacceptable in connection with data and word processing systems and in this field attempts are made to circumvent them by use of spare equipment with the costs resulting therefrom.

It is the object of the invention to provide an information printer suitable in particular for the latter application and breaking with the conventional technical design of electrophotographic machines by a very simple structural design, a considerably simpler maintenance and improved flexibility in respect of machine structure.

According to the invention, in an information printer of the kind mentioned this is accomplished in that the processing stations having mechanical movement functions are designed as separate replaceable modules for insertion into an apparatus housing and each have its own independent driving means in the form of an electronic stepping motor and that the modules are provided with external connectors in the form of connection plugs for direct insertion into terminal connections in a coupling unit, said terminal connections being connected, on one hand, to an operating voltage source for supplying operating voltages to each module and, on the other hand, to a common programme-controlled control unit for controlling the operative cooperation of the modules.

Said processing stations having mechanical movement functions comprise the photoconductor station in which the movable photoconductor may be e.g. a rotating drum or a revolving belt-photoconductor driven by drive rollers as well as the developer station in which transport of toner powder from a toner supply onto contact with the photoconductor may take place by means of a rotating magnetic brush and in addition the sheet advancing stations and the fixation station, each of which includes at least one driven roller.

As a result of the module design these stations, which are preferably inserted into supporting means in a frame structure of the machine housing in such a way as to be accessible from one and the same openable side thereof, may be individually removed from and inserted into the machine casing without interferring with the remaining modules.

For each of said modules, which are sensitive just as a result of their mechanical functions, repair of a malfunction may thus take place by a simple and quick replacement operation.

As the result of the use of an electronic stepping motor as a driving means in each of these modules mechanical transmissions between the modules mutually or from the modules to a common motor is not in use which also makes a major contribution to make the information printer more easy to service by improving the accessibility to all parts of the machine.

Operation of the stepping motor in the individual modules is initiated by control from the common control unit which preferably comprises a micro processor programmed to initiate the mechanical movement functions in said modules as well as other operations in a working cycle such as charging and decharging of the photoconductor by means of corona wires at the right moments in a sequence of operations. By this control the stepping motor will be individually supplied with pulse sequences which without any need for feed-back or position-sensing causes it to rotate with a prescribed speed or a prescribed angular turn.

Thereby, the further advantage is obtained that operation parameters for the individual modules may be changed individually by simple reprogramming of the control unit. Thereby, it is made possible for a given machine to make changes in the individual modules concurrently with the development of technology without any need of changes in other parts of the machine.

The external connections, by which the modules are electrically connected to a coupling unit, serve, on one hand, to supply the necessary operational voltage or pulse sequences to the stepping motors and other active elements of the modules and, on the other hand, the transmission of surveying or status signals from the modules to the common control unit as means of information about e.g. toner and sheet supply or the temperature in the fixation station inasmuch as the latter is of the hot-fusing type.

As a particular advantage of the invention the module design opens the possibility to use an increased number of different sheet supplies whereby either the sheet capacity of the machine is increased with automatic switching between the individual paper supplies so that interruptions of operation following from feeding of sheets are avoided or the machine may operate with an increased number of different sheet types which may be individually selected.

In an embodiment, which is characterized in that the module for said first advancing station is designed as a sheet feeding unit having a collecting roller and sheet advancing rollers as well as at least one guide means and is built into a sheet cassette having an outlet slit facing the image transfer station, this result is obtained in a simple way in that a number of sheet cassettes with associated sheet feeding units are arranged above each other with sheet advancing rollers and guide means positioned below an outlet slit in the upper wall of the cassette outside sheet supply in the cassette, a slit being provided opposite said outlet slit in the bottom wall of the cassette for receiving sheets from an underlying cassette.

In the following the invention will be explained in further detail with reference to the accompanying drawings, in which FIG. 1 is a perspective view of an information printer according to the invention with the walls of the machine casing removed;

Figure 1:
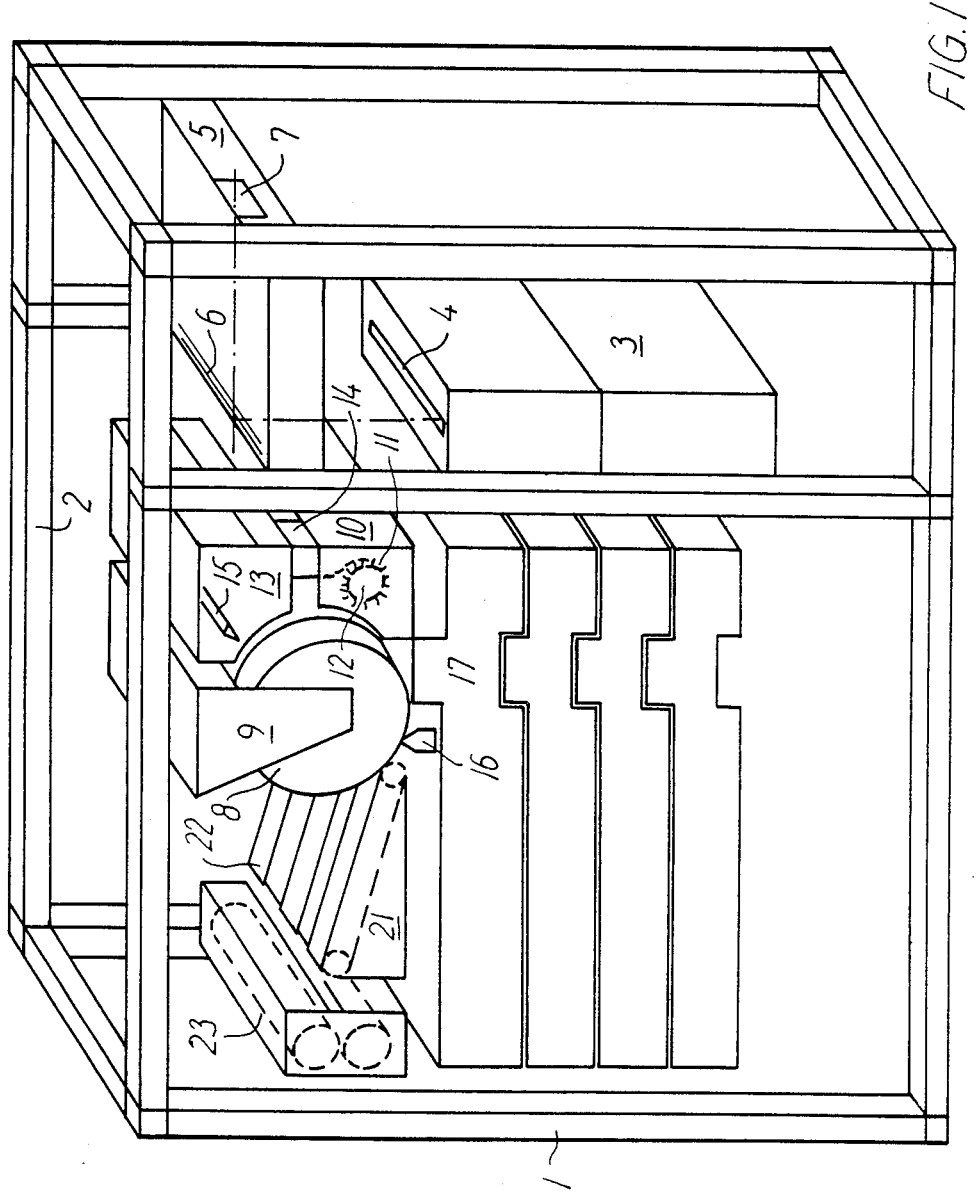

In the embodiment shown in FIG. 1 the machine casing of the information printer, the side walls of which are removed, comprises a box-like frame structure having vertical and horizontal frame members 1 and 2 to which supporting means, not-illustrated, are secured in the form e.g. of sliding rails for the arrangement of the processing station designed as separate individually replaceable modules.

An imaging module 3, to which electronic information signal codes are supplied, is constituted in this embodiment by an electronically controlled line-scanning electro-optical device having a scanning direction as shown by a light exit slit 4.

Such an electro-optical device may be constituted e.g. by a cathode ray tube having a high brilliance whereby the advantage is obtained that the imaging unit unlike other scanning imaging devices do not comprise mechanically moved scanning members.

However, also devices of the latter kind employing e.g. a controlled laser beam may be used.

An optical module 5, which may be of a design known per se including mirrors 6 and 7, causes light information from the imaging module 3 to be focused onto a movable photoconductor 8 in a photoconductor module 9.

The photoconductor 8 may consist in a known manner of a rotating drum having a photoconductive coating.

In an operative relation to the photoconductor 8 a developer module 10 is arranged having a toner supply 11 and a rotating magnetic brush 12 for transferring toner powder onto the photoconductor for development of a latent electrostatic image thereon.

Moreover, there is arranged in association with the photoconductor 8 a toner cleaning and recycling module 13 which is connected with the developer module 10 through a duct 14.

The module 13 is arranged above the module 10 with an intermediate separation allowing for passage of the optical information from the module 5 onto the photoconductor 8.

In the module 13 or in connection therewith an electrostatic charging means in the form of a corona wire 15 is arranged.

In order to decharge the photoconductor 8 for the purpose of transferring a powder image developped by means of the developer module 10 onto a sheet of printing material an image transferring module 16 having a corona wire is provided.

In order to advance the sheet material from a sheet supply to image transfer contact with the photoconductor 8 a first advancing module 17 is provided which is designed in the embodiment shown as a sheet feeding unit with a collection roller 18 and sheet advancing rollers comprising a driven roller 19 and a number of pressure rollers 20. The sheet feeding unit is built into a sheet cassette the detailed design of which will appear from the following.

Subsequent to the image transfer the information carrying sheet is stripped from the photoconductor 8 and transferred to a second sheet advancing module 21. By means of this module, which may comprise e.g. a number of belts 22, the sheet is transferred to a fixation module 23 for permanently affixing the transferred powder image to the sheet.

The module 23 may be either of the hot fusing or the pressure fixation type.

The modules 3, 5, 9, 10, 13, 16, 17, 21, and 23 are all designed as separate, individually replaceable modules, and those modules comprising mechanically movable parts, in the example shown rotating elements, i.e. all the above-mentioned modules with the exception of the modules 3, 5, and 16, comprise each as an independent drive means an electronic stepping motor.

Figure 2:
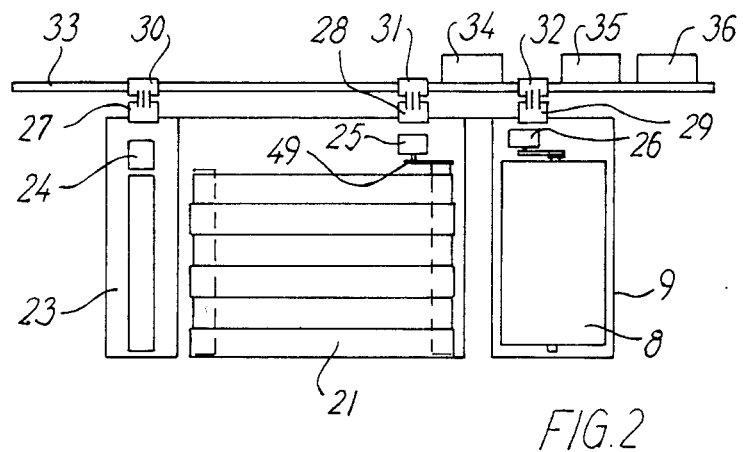
FIG. 2 illustrates the connection of a number of module units to a coupling unit.

As is apparent from FIG. 2 showing the modules 10, 21, and 23 the stepping motors 24, 25, and 26 associated therewith are built-in into its own module in the embodiment shown whereby an optimum flexibility in respect of the machine design is obtained.

For each module the only external connection consists of a plug 27, 28, and 29, respectively, for direct insertion into terminal connections 30, 31, and 32 of a coupling unit 33 which may have the same design as a circuit card. The terminal connections 30, 31, and 32 are connected, on one hand, to a power supply unit 34 for supplying operational voltages to the modules and, on the other hand, to a common program-controlled control unit 35.

The units 34 and 35 are arranged together with an interface module 36 on the side of the plate shaped coupling unit 33 opposite the modules 10, 21, and 23.

The interface module 36 serves in a known manner as a matching device between the imaging module 3 and an electronic data or word processing system in accordance with the standard protocol applicable therefor.

Figure 3:
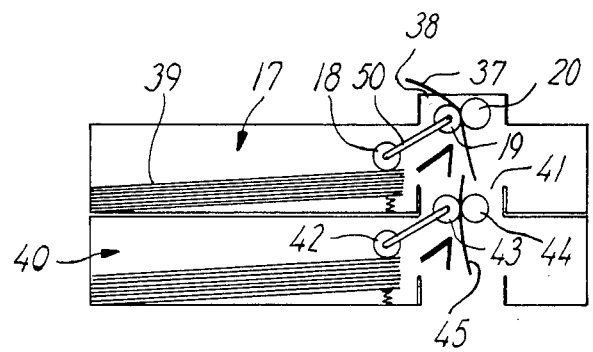
FIG. 3 shows the design of sheet cassette modules.

The advancing module or sheet cassette 17 is incorporated in the embodiment shown as the upper one of a stack of four sheet cassettes. As shown in FIG. 3 this module has the sheet advancing rollers 19 and 20 and a guide wall 37 cooperating therewith positioned below an outlet slit 38 in the upper wall of the cassette 17 outside a sheet supply 39 positioned in the cassette.

For cooperation with the underlying cassette(s) 40 only one of which is shown in FIG. 3 an opening 41 is furthermore provided in the bottom wall of the cassette 17 to receive sheets from the cassette 40.

In principle, the cassette 40 is designed in the same way as the cassette 17 in respect of the positions of a sheet collecting roller 42 and sheet advancing rollers 43 and 44. However, in this case the guide wall 45 cooperating with the latter rollers has a more rectilinear form for advancement of sheets from the cassette 40 to the intermediate clearance between rollers 19 and 20 in the cassette 17, the guide wall 37 of which is curved to define a sheet advancing path leading to the image transfer module 16.

As is apparent from the above the modules in the information printer according to the invention perform in principle the same working operations as corresponding units of a xerographic copying machine. Irrespective of the fact that the preceding description with the particular embodiment of the imaging module as designed for use as a printing unit for an electronic data or word processing system the module design according to the invention may be employed in copying machines for reproduction purposes with the same advantages as mentioned hereinbefore.

Moreover since the module design provides the advantage of a very high flexibility in respect of machine design it will be clear that information printers according to the invention may be designed with a varying machine structure relative to the one shown in FIG. 1.

Figure 4:
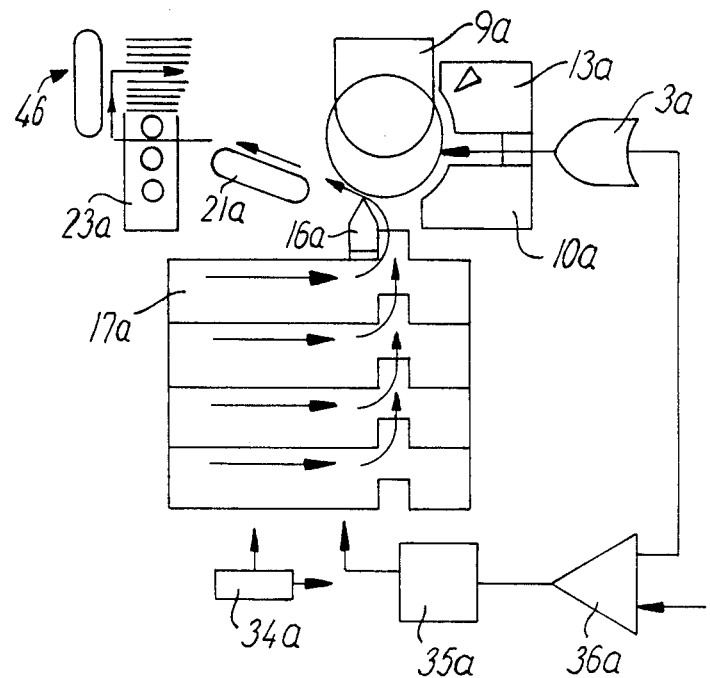
FIGS. 4 and 5 illustrate further examples of design of an information printer according to the invention.
Figure 5:
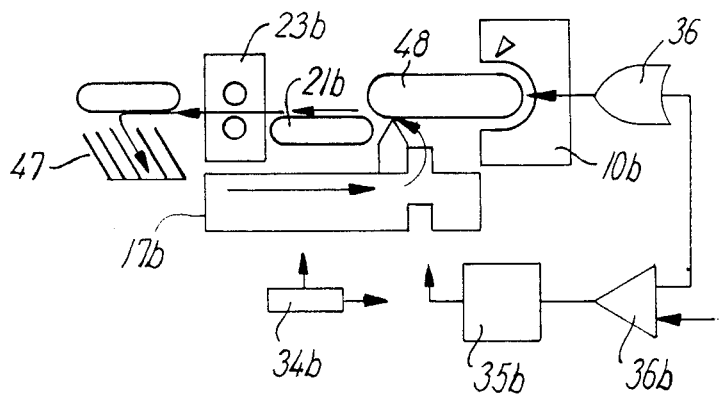

Examples thereof are shown in FIGS. 4 and 5 in which the parts symbolically illustrated corresponding to those shown in FIG. 1 are designated with the same reference numeral succeeded by a and b, respectively.

Thus, in the design in FIGS. 4 and 5 a sheet sorting module 46 and 47, respectively, is arranged in connection with the fixation module 23a and 23b, respectively. In FIG. 5 a belt-shaped photoconductor 48 is used instead of the rotating drum.

As is apparent from FIGS. 2 and 3 mechanical transmission members may well be present within the individual modules. The use of such transmission members, which in view of the movement characteristics of the stepping motors should preferably be toothed belts as shown at 49 in FIG. 2 and 50 in FIG. 3, will also to a certain extent contribute to increasing the flexibility.

It is not unconditionally necessary that the stepping motors as shown in FIG. 2 are built into the individual modules. Instead the stepping motors may be mounted in the coupling unit 33 to receive a mechanical coupling member from each of the respective modules. However, thereby some of the flexibility will get lost.

I claim:

1. An electrophotographic information printer, particularly for use in connection with electronic data and word processing systems, said printer having a number of processing stations comprising a photoconductor station (9) with an electrostatically chargeable, movable photoconductor (8);

an imaging station (3) in optical information transfer relation to the photoconductor station (9);

a developer station (10) with a toner development system and a toner cleaning station (13) arranged in operative relation to the photoconductor station (9);

an image transfer station (16) arranged in operative relation to the photoconductor station (9) for transferring a toner image on the photoconductor (8) to a sheet-shaped printing material;

a first advancing station (17) arranged between the image transfer station and a supply of printing material;

a fixation station (23) for permanently affixing a toner image to the printing material; and a second advancing station (21) arranged between the image transfer station (16) and the fixation station (23), characterized in that processing stations (9, 10, 13, 17, 21, 23) having mechanical movement functions are designed as separate replaceable modules for insertion into an apparatus housing (1, 2) and each have its own independent driving means (24-26) in the form of an electronic stepping motor and that the modules are provided with external connectors in the form of connection plugs (27-29) for direct insertion into terminal connections (30-32) in a coupling unit (33), said terminal connections being connected, on one hand, to an operating voltage source (34) for supplying operating voltages to each module and, on the other hand, a common programme-controlled unit (35) for controlling the operative cooperation of the modules.

2. An information printer as claimed in claim 1, characterized in that said stepping motors (24-26) are built into each of said modules having mechanical movement functions.

3. An information printer as claimed in claim 1 or 2, characterized in that the imaging module (3) comprises an electronically controlled line-scanning electro-optical device with a scanning direction perpendicular to the direction of movement of the photoconductor.

4. An information printer as claimed in claim 3, characterized in that an interface module (36) for receiving control signals from a data or word processing system is connected to the imaging module (3) and the control unit (35).

5. An information printer as claimed in claim 3, characterized in that the line-scanning device is a cathode ray tube.

6. An information printer as claimed in claim 1, characterized in that the toner cleaning module (13) comprises an electrostatic charging member (15) and is operatively connected with the developer module (10) for recirculation of toner thereto.

7. An information printer as claimed in claim 1, characterized in that the module (17) for said first advancing station is designed as a sheet feeding unit having a collecting roller (18) and sheet advancing rollers (19, 20) as well as at least one guide means (37) and is built into a sheet cassette (17) having an outlet slit (38) facing the image transfer station (16).

8. An information printer as claimed in claim 1 characterized in that a number of sheet cassettes (40) with associated sheet feeding units are arranged above each other with sheet advancing rollers (43, 44) and guide means (45) positioned below an outlet slit (38) in the upper wall of the cassette outside a sheet supply (39) in the cassette, a slit (41) being provided opposite said outlet slit (38) in the bottom wall of the cassette for receiving sheets from an underlying cassette.

* * * * *